Oct. 30, 1934.  W. H. ROBERTSON  1,978,914
CASH REGISTER
Original Filed Feb. 19, 1927   5 Sheets-Sheet 1

FIG. 1

Inventor
William H. Robertson
By   Kearl Berst
His Attorney

Oct. 30, 1934.  W. H. ROBERTSON  1,978,914

CASH REGISTER

Original Filed Feb. 19, 1927  5 Sheets-Sheet 2

Inventor
William H. Robertson
By
Carl Benst
His Attorney

Oct. 30, 1934.  W. H. ROBERTSON  1,978,914
CASH REGISTER
Original Filed Feb. 19, 1927   5 Sheets-Sheet 3

Inventor
William H. Robertson
By Earl Benst
His Attorney

Oct. 30, 1934.  W. H. ROBERTSON  1,978,914
CASH REGISTER
Original Filed Feb. 19, 1927  5 Sheets-Sheet 4

Inventor
William H. Robertson
By Earl Beust
His Attorney

Oct. 30, 1934.   W. H. ROBERTSON   1,978,914

CASH REGISTER

Original Filed Feb. 19, 1927   5 Sheets-Sheet 5

Inventor
William H. Robertson
By
[signature]
His Attorney

Patented Oct. 30, 1934

1,978,914

UNITED STATES PATENT OFFICE

1,978,914

CASH REGISTER

William H. Robertson, Dayton, Ohio, assignor to The National Cash Register Company, Dayton, Ohio, a corporation of Maryland Original application February 19, 1927, Serial No. 169,583. Divided and this application October 21, 1932, Serial No. 638,888

20 Claims. (Cl. 235—130)

This invention relates to improvements in cash registers and more particularly to the type shown and described in the United States Letters Patent No. 1,816,263, granted July 28, 1931 to William H. Robertson, and is a division of application for United States Letters Patent Serial Number 169,583 filed February 19, 1927 by William H. Robertson now Patent No. 1,929,652, issued October 10, 1933.

The present invention relates to mechanisms associated with the total lever, the amount keys and the repeat key, which mechanisms are so arranged that it is impossible to depress the repeat key after an amount key has been depressed to set up an amount, and also impossible to depress the repeat key when the total lever is out of adding position.

As has been clearly illustrated and described the parent application above mentioned, the repeat mechanism of this case is entirely novel, there being nothing on the market which comes anywhere near approximating the invention.

In the machines which have been on the market for several years, when the operator desires to make a repeat operation he first sets up his amount on the amount keys and then depresses the repeat key so that the machine can be run through more than one operation to successively add or subtract, as the case may be, the amount set up on the keyboard without having to set it up again. In these types of machines it is therefore absolutely necessary that the operator know before he sets up the amount on the keyboard or at least before he operates the machine that he wishes to repeat that number once or several times.

With applicant's novel machine it is not at all necessary to know when the operator sets up the amount that he may wish to repeat it, because in this machine the amounts can be entirely erased from the keyboard by allowing all of the keys to be released to their normal positions at the end of the operation and then if upon discovering that the second operation requires the same set up of an amount, all that is necessary for the operator to do is depress the repeat key, without depressing any of the amount keys whatsoever, whereupon the machine will automatically repeat the amount which was set up and added on the previous operation. It is again to be emphasized that this theory of operation is wholly different from the theory of the repeat operation of machines which are now on the market. In other words, with the machines now on the market it is absolutely necessary for the operator to know that he wishes to repeat the amount set up on the keyboard and it is also absolutely necessary for him to depress the repeat key at the same time that he depresses the amount keys, whereas in applicant's machine that is the very thing he wishes to avoid.

It is therefore one of the broad objects of this invention to provide a novel mechanism for rendering the repeat mechanism ineffective upon depression of any one or more of the amount keys.

Another object of this invention is to provide a novel mechanism preventing operation or depression of any one or more of the amount keys after the repeat key has been operated.

It is a further object of this invention to provide a novel combination of means for setting up an item, entering the same in the machine and then erasing the set up to permit the setting up of another item, a manipulative means for releasing the machine and for controlling a differentially adjustable device to cause a repeat entry of the item previously entered, and means under control of the item setting means for preventing an operation of the manipulative means when the item setting means is operated to set up an item subsequently to the erasure of the previous set up.

Another object of the present invention is to provide novel mechanism associated with and operated by the amount detent for preventing an operation of the repeat key when any one or more of the amount keys is depressed.

Another object of this invention is to provide a novel interlocking means intermediate the total lever and the repeat key.

With these and incidental objects in view, the invention consists of certain novel features of construction and combinations of parts, the essential elements of which are set forth in appended claims and a preferred form of embodiment of which is hereinafter described with reference to the drawings which accompany and form part of this specification.

General description

Described in general terms, the machine to which the present invention has been applied for illustrated purposes is one adapted to be used on bus lines, either on the bus itself, or in the ticket office as has been fully explained in the parent application.

Figure 13:
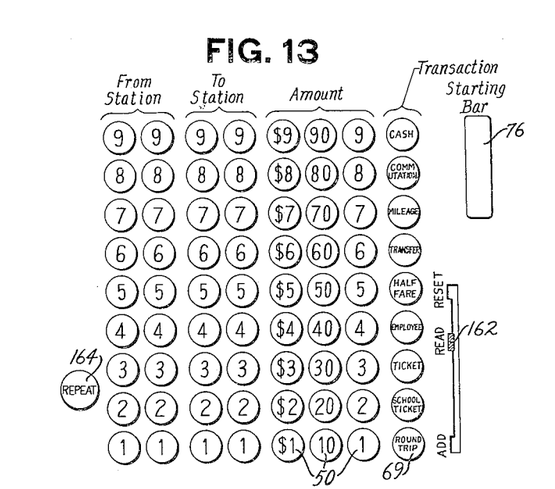
Fig. 13 is a diagrammatic view showing the keyboard of the machine shown in the parent application and to which the present invention, for illustrative purposes, is applied.

By referring to Fig. 13 which shows the diagrammatic view of the keyboard, it can be clearly seen that this machine is provided with a single bank of transaction keys to record the various kinds of fares entered into the machine, four banks of keys for setting up the station at which the passenger boards the bus and the station to which the passenger is going. Two of these four banks have been set aside for the "from" stations and two for the "to" station, thereby providing for ninety-nine stations in each case. The machine is also provided with three banks of amount keys for setting up the amount of the fare.

If the machine is to be used in the station instead of on the bus itself the four banks are all used for the destination station, thereby making it possible to set up and total of 9,999 destination stations. In such a machine the "from" station would be printed by means of fixed electro such as is well known in the art.

A repeat release key is also provided by means of which the operator may issue as many tickets of the same denominational value as desired. The main characteristic feature of this repeat release key lies in the fact that the operator need not know at the time of making the original entry whether or not a repeat operation is to be performed. And as has been previously stated this mechanism is absolutely novel. None of the machines on the market today are capable of operating in that manner, since the operator must know at the time he makes the original entry that he wishes to repeat that entry and at the same time he must press the repeat key while the amount keys are depressed.

In applicant's machine that is one of the things which he wished to avoid, that is, the simultaneous depression of the amount keys and the repeat key and he has therefore provided a novel mechanism for preventing the depression of the repeat key when any one or more of the amount keys are in their depressed position and vice versa, whenever the repeat key is depressed then it is absolutely impossible to depress any one of the amount keys.

If two or more passengers get on the bus at the same station and each is going to the same destination, the operator sets up the amount of fare, the destination and the station at which the passengers board the bus for the first passenger and issues the ticket. Thereafter as other passengers board the bus, all that the operator need do is to press the repeat release key, which will release the machine and cause a ticket to be issued for the next passenger.

A total control lever is also provided for controlling the machine for add, read or reset operations. A motor bar is used to release the machine for operation. The machine may however be operated either by an electric motor or by hand as may be convenient.

There is also a novel locking device interposed between the repeat release key and the total lever, so that when the total lever is out of its adding position it is impossible to depress the repeat key.

Detailed Description

Amount banks

The machine is provided with three banks of amount keys 50 (Figs. 1 and 13) the keys of each bank being slidably mounted in a key frame 51 supported on rods 52 and 53 carried in side frames 54 and 55 (Figs. 1 and 12) of the machine. Each key 50 is held in its outer or normal position by a coil spring 56 which surrounds the shank of the key in the usual and well known manner. Each key bank is provided with a flexible detent 57 with which a stud 58 secured to each key 50 cooperates. The depression of a key causes the detent 57 to be cammed downwardly against the tension of a spring 59 until the stud 58 passes the shoulder on the detent 57 whereupon the spring 59 causes the detent to be moved upwardly, thereby holding the key in its depressed position.

Each bank is also provided with a locking detent 60 which upon release of the machine is moved upwardly by mechanism to be hereinafter described, thereby moving beneath the studs 58 of the undepressed keys and over the stud 58 of the depressed key, thereby locking the undepressed keys in their outer positions and the depressed key in its inner position. The flexible detent 57 and the locking detent 60 are carried on studs 61 secured to the key frame 51.

Figure 1:
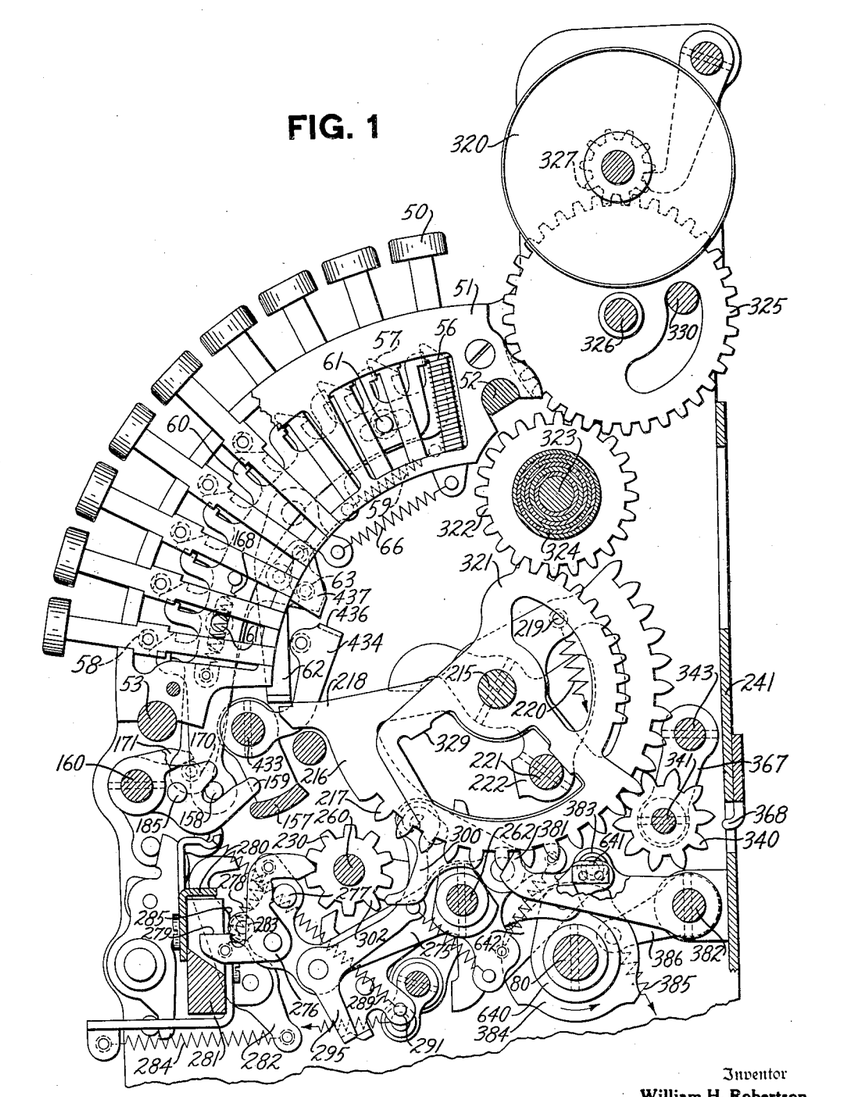
Fig. 1 is a vertical cross-sectional view showing one of the amount banks and its associated mechanisms.
Figures 9, 10:
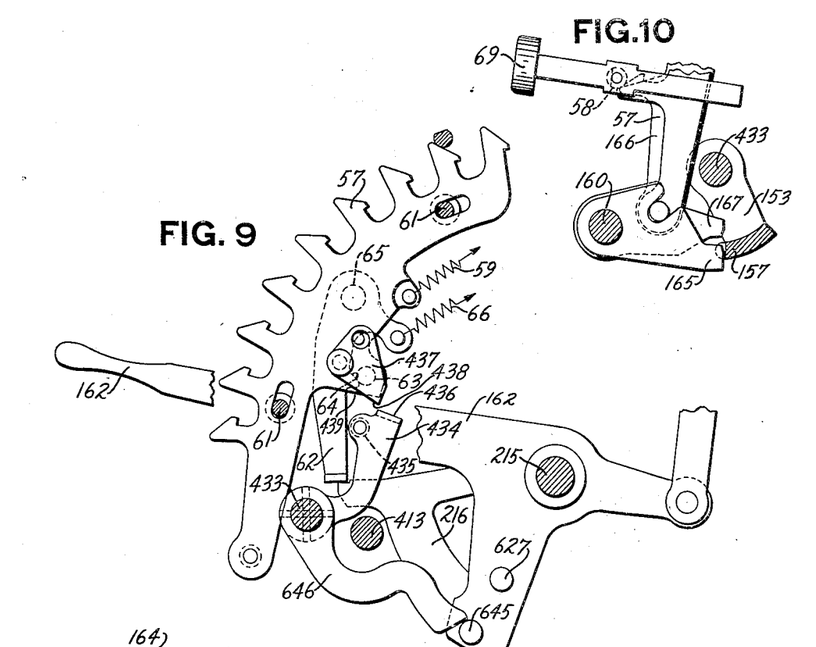
Fig. 9 is a detail view of the interlock between the total lever and the amount keys and also shows one of the detents associated with the amount keys which carries a part of the interlocking mechanism between the amount keys and the repeat release key.
Fig. 10 is a detail view of a part of the interlocking mechanism in the transaction bank.

Each bank of keys is provided with a zero stop lever 62 (Fig. 1) for controlling the differential mechanism to be later described when no key is depressed in the bank. The pawl 62 is rocked to its ineffective position by a stud 63 carried by the flexible detent 57 when any key is depressed. The depression of a key causes the detent 57 to be lowered as above described thereby rocking the pawl 62 in a clockwise direction by engagement of the stud 63 with a shoulder 64 on the pawl 62. The pawl 62 is pivoted to the key frame 51 by a stud 65 and is held in engagement with the stud 63 at all times by a spring 66 (Fig. 9) stretched between a stud on the pawl and a stud on the key frame 51 as shown in Fig. 1. These springs 66, therefore, restore all of the zero stop pawls 62 to their normal positions at each operation of the machine. During repeat operations, to be later described, the springs 66 associated with the "to" and the amount bank assist in restoring certain parts to their home positions.

*Station bank*

The four left hand banks of keys 67 and 68 (Fig. 13) shown herein as the "to" and "from" bank are of the same construction as the amount banks. The "to" banks of keys are what are known in the add as "stay down" keys, that is, they are not released at the end of the operation of the machine. This result is obtained by preventing operation of the flexible detent at the end of the operation of the machine. With this exception the construction of the station bank of keys is identical with the construction of the amount banks and therefore no further description is thought necessary.

*Transaction bank*

The transaction bank of keys 69 is also constructed similar to the amount bank of keys and they also are stay down keys. These transaction keys are used for printing identification characters and indicating the kinds of fare entered into the machine as is fully illustrated and described in the parent application above referred to. This transaction bank of keys is provided with an interlock which makes it necessary for a key in this bank to be depressed before the machine can be released for operation. Inasmuch as one of the keys in this bank must be in depressed position the differential mechanism need never stop at zero and for this reason the zero stop pawl 62 which has been provided in the amount banks and in the "to" and "from" banks has been omitted from the transaction bank.

*Operating mechanism*

After the operator has depressed the desired keys representing the transaction he may operate the machine either by means of a crank (not shown) or by means of an electric motor. The motor is located beneath the register mechanism and access thereto may be had through a door in the front of the cabinet, (not shown). The depression of a motor bar 76 causes the clutch mechanism controlling the motor to trip. Such clutch mechanism is shown and described in United States Letters Patent to Charles F. Kettering and William A. Chryst 1,144,418, dated June 29, 1915.

Release of the motor causes a main cam shaft 80 (Figs. 1, 2, 6 and 7) to receive one complete rotation which will operate the machine by means of a train of mechanism including pinion 81, pinions 82 and 83 secured together and mounted on a stud 84, and pinion 85 which is secured to a worm gear 86 which meshes with a worm gear 87 on the main cam shaft 80. The pinion 81 is secured by a sleeve clutch to one member of the motor clutch above referred to. Therefore, when the motor clutch is driven, the pinion 81 through the train of pinions and gears 82, 83, 85, 86 and 87 causes the main cam shaft 80 to receive one complete rotation on every operation of the machine.

*Machine releasing mechanism*

Figures 2, 3, 4, 5:
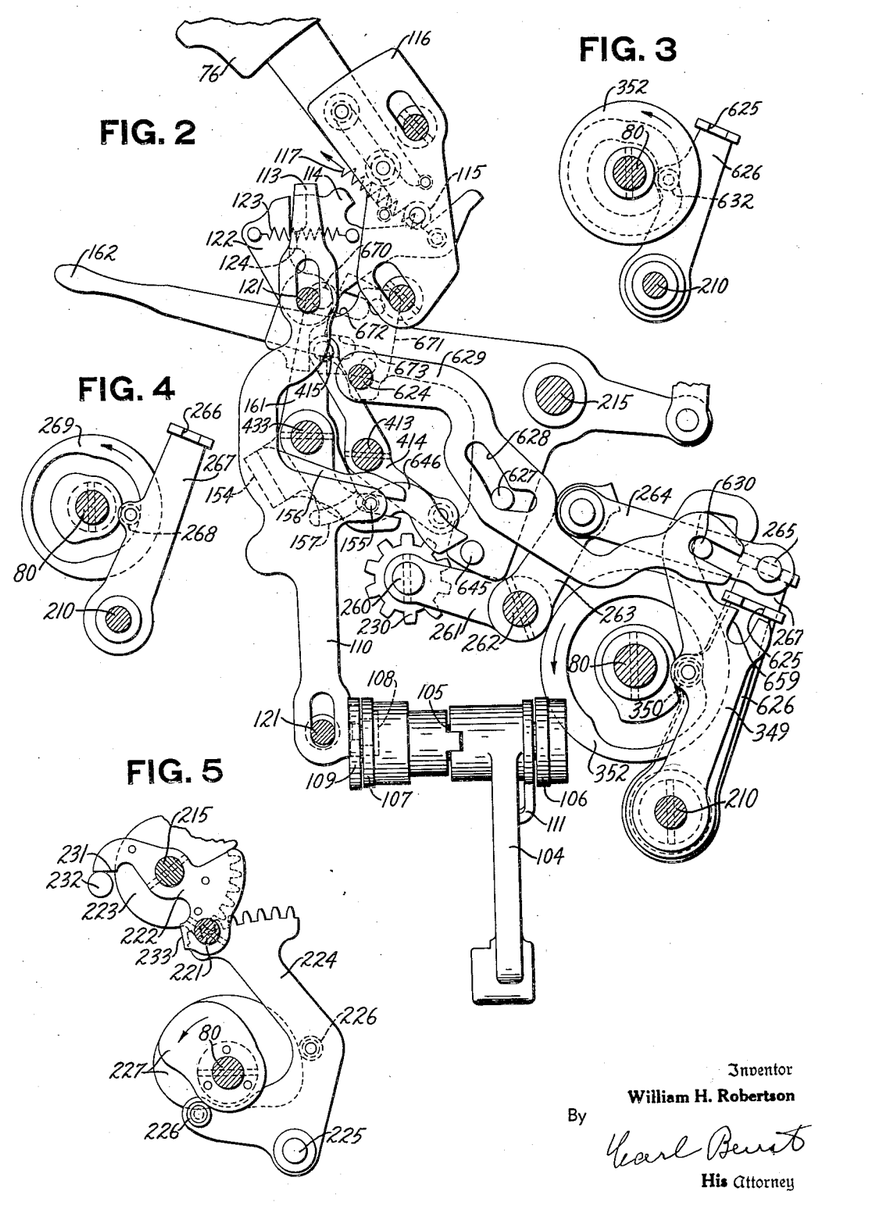
Fig. 2 is a detail view showing the total control lever and its associated mechanism, together with the motor bar and the mechanism for releasing the machine.
Fig. 3 is a detail view of the cam for engaging the totalizer with and for disengaging it from the actuators during "read" operations.
Fig. 4 is a detail view of the means for engaging the totalizer with the actuators and for disengaging it from the actuators during adding operations.
Fig. 5 is a detail view of the totalizer differential operating mechanism.
Figure 6:
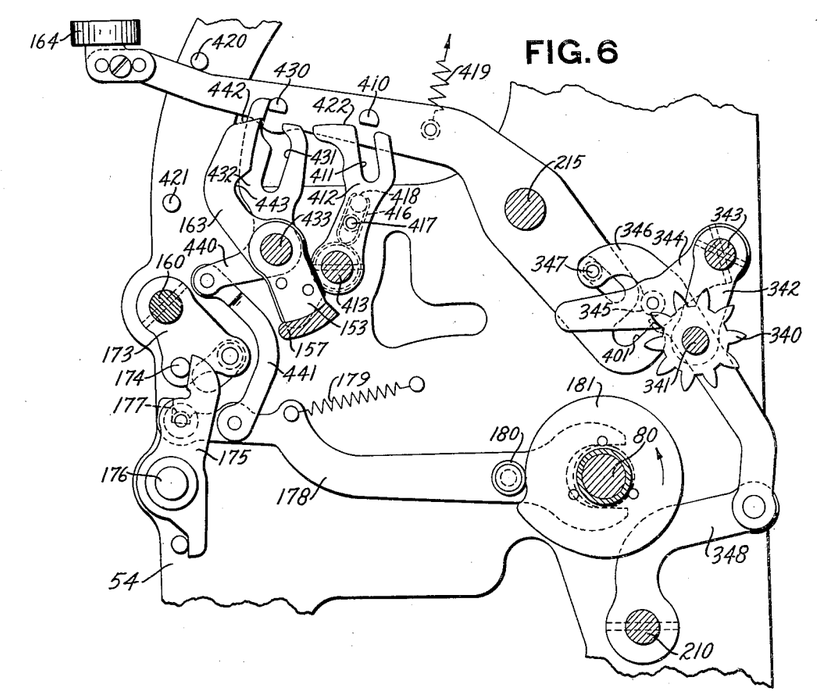
Fig. 6 is a detail view of the repeat release key together with its associated mechanism.
Figure 7:
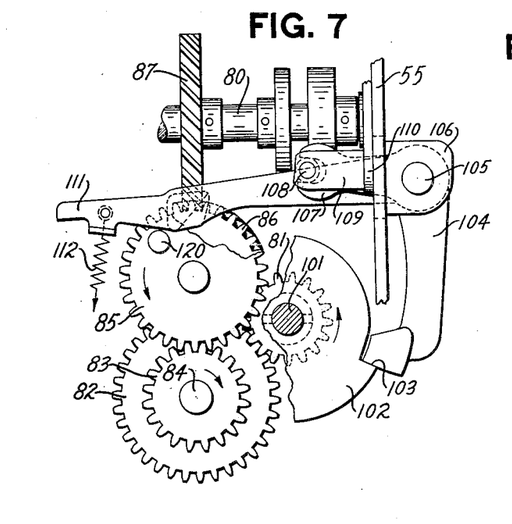
Fig. 7 is a fragmentary view showing in detail a portion of the mechanism for driving the main operating shaft of the machine from the motor. This figure also shows a part of the machine releasing mechanism.

The machine is released for operation by the motor bar 76 (Figs. 2 and 13).

The above mentioned pinion 81 (Fig. 7) is loose on a stud 101 upon which is also mounted a disk 102 clutched to the pinion 81. The disk 102 has a shoulder 103 which is normally engaged by an arm 104 loose on a stud 105 mounted in two ears 106 carried by the right side frame 55 (see also Fig. 2). The arm 104 is clutched to a bifurcated arm 107 which engages the stud 108 mounted in a flange 109 on a link 110 slidably supported on studs 121. Secured to the hub of the arm 104 is arm 111 to which is attached a spring 112 which constantly tends to rotate the arm 111 counter-clockwise as viewed in Fig. 7. The spring 112 by means of the arms 111 and 107 normally tends to lower the link 110 but is prevented from doing so by a flange 113 (Fig. 2) formed on the upper end of the link 110 normally engaging a release pawl 114 which is held by a spring 117 against a stud 115 mounted on a slide 116. The motor bar 76 is removably mounted on two studs carried by the slide 116 and it can be seen that the spring 117 normally maintains the motor bar 76 in its outer or normal position.

The depression of the motor bar 76, through the slide 116 and stud 115 causes the pawl 114 to be rotated clockwise (Fig. 2) thereby withdrawing the pawl 114 from beneath the flange 113 and permitting the spring 112 to lower the link 110. Such lowering of the link 110 rocks the arm 104 counter-clockwise (Fig. 7) and removes said arm 104 from the shoulder 103 on the disk 102, thus releasing the clutch mechanism thereby permitting the machine to begin an operation.

This releasing of the disk 102, permits the operation of a spring driven cam (not shown) for closing a circuit through the motor and for permitting the motor to operate. The mechanism for closing the circuit through the motor is well known in the art and is well illustrated and described in the above mentioned Kettering and Chryst patent.

The link 110 is restored to its normal position near the end of the operation of the machine by a stud 120 (Fig. 7) secured to the gear 85. This stud 120 engages the arm 111 and by means of the arm 107 and in connection with the link 110 lifts the link high enough to allow the pawl 114 to rock beneath the flange 113.

The rocking of the arm 111 by the stud 120 also rocks the arm 104 to its normal position in the path of the shoulder 103 so that the machine will stop upon contact of the shoulder 103 with the arm 104.

A well known non-repeat pawl 122 (Fig. 2) is provided to prevent a second operation of the machine in case the motor bar is not permitted to return to its normal position before the end of the operation of the machine. In other words if the operator should hold the motor bar in its depressed position as the machine completes its operation the non-repeat pawl 122 would be held beneath the flange 113 by a spring 123 which normally holds the pawl 122 in engagement with a flange 124 on the release pawl 114. The operation of this non-repeat pawl is well known in the art and it is therefore thought that no further description thereof will be necessary herein.

Locking detent operating means

As previously stated each bank of keys is provided with a locking detent 60 (Fig. 1) which is moved beneath the studs 58 of the undepressed keys and above the stud 58 of the depressed keys, thus preventing depression of a key or the release of the depressed keys after the machine has once been released for operation.

Mechanism for operating this locking detent is under control of the link 110 (Fig. 2) which carries a stud 155 embraced by a bifurcated arm 156 of a yoke or bail 154 having integral therewith an arm 161 to be later described. The bail 154 is also integral with another yoke or bail 157 which extends across and to the rear of the lower end of all of the locking detents 60. Each locking detent is provided with a stud 158 (Fig. 1) which projects into a bifurcated arm 159 loosely mounted on a shaft 160 carried by the side frames 54 and 55. The downward movement of the link 110 upon releasing the machine as above described causes the yoke 157 to rock clockwise, thereby engaging all of the arms 159 which by means of the stud 158 raises all of the locking detents 60 into their locking positions.

Figure 11:
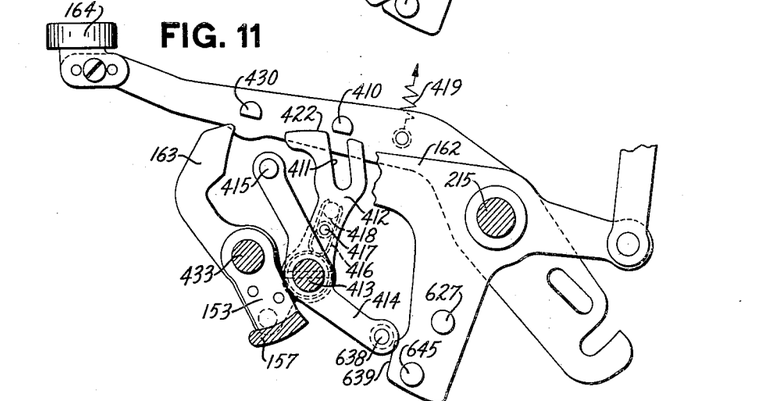
Fig. 11 is a detail view of the repeat release key and interlocks associated therewith.

The yoke 157 is integral with the arm 161 so as to prevent operation of a total lever 162 after the machine has been released. This yoke 157 is also integral with the arm 153 which is rigidly connected to an arm 163 (Fig. 11) for preventing operation of a manually operable repeat release key 164 after the machine has been released. The arms 153 and 161 are pivotally supported on a shaft 433. This mechanism just referred to will be hereinafter described.

Near the end of the operation of the machine when the link 110 is restored to its home position as previously described, the yoke 157 is returned to its normal position, thereby allowing the locking detent 60 and the arms 159 to return to their normal positions under tension of a spring 168 (Fig. 1). However, if for some reason the above mentioned parts should not restore by the spring 168 to their normal positions, the key release mechanism to be presently described will positively restore the locking detent 60 and the arms 159 to their normal positions.

The link 110 cannot be released until a key in the transaction bank is depressed. To prevent such release, an arm 165 (Fig. 10) pivoted on the shaft 160 lies in the path of the yoke 157 when no key in the transaction bank is depressed. However, when a transaction key 69 is depressed, the stud 58 thereon moves a releasing bar 166 downwardly and through its connection with the arm 155 moves said arm 155 out of the path of the yoke 157, thus allowing the machine to be released.

Arm 167 (Fig. 10) is connected to the flexible detent 57 for the transaction bank thus preventing release of the machine until a transaction key is fully depressed. A partial depression of a transaction key 69 causes the flexible detent 57 to be lowered thereby rocking the arm 167 into the path of the yoke 157. However, when the stud 58 passes the hook on the flexible detent 57 this detent will be elevated until the yoke 157 is again free to operate, thereby permitting release of the machine after the transaction key is fully depressed.

Key release mechanism

Mechanism has been provided for releasing the amount keys 50 and the "to" keys at the end of each operation of the machine. However, inasmuch as the "from" and the "transaction" keys are stay down keys, this mechanism will have no effect upon them.

Each flexible detent 57 in the "to" and amount banks is provided with a stud 170 (Fig. 1) normally held against an arm 171 by the spring 59. Upon depression of a key its stud 58 as previously described is engaged by the hook on the detent 57. In order to release the key it is necessary to lower the flexible detent 57. The arms 171 are secured to the shaft 160 to which is also secured an arm 173 (Fig. 6) upon which is mounted a stud 174 held in contact with an arm 175 loosely mounted on a stud 176 carried by the left side frame 54. The arm 175 has a stud 177 which is engaged by a pitman 178, such engagement being maintained by a spring 179. This spring 179 also assists in restoring other parts associated with the repeat operation, (later described) to their home positions, in a manner to be hereinafter set forth.

The pitman 178 carries a roller 180 cooperating with a cam 181 secured to the main cam shaft 80. The cam 181 is so timed that near the end of the operation of the machine it moves the pitman 178 to the left (Fig. 6) thereby rocking the arms 175 and 173, and consequently the shaft 160 slightly in a clockwise direction, which movement of the shaft 160 causes the arm 171, through the stud 170, to lower the flexible detent 57 far enough to permit the spring 56 to return the keys 50 and 67 to their normal outer positions.

The arms 171 are wide enough to contact not only the studs 170, but also studs 185 (Fig. 1) on the arms 159, to restore the locking detents 60 to their normal positions if they, for any reason, should happen to stick and not be returned by the spring 168.

Differential mechanism

The differential mechanism for all of the banks, excepting the four lefthand or station banks are identical, and therefore only one of the differential mechanisms will be described herein. This differential mechanism is of the spring-actuated type, that is, the type in which the actuator is adjusted under the influence of a spring, the differential movement thereof being controlled by the depressed key.

Carried by the side frames 54 and 55 is a shaft 215 (Fig. 1). Pivoted on the shaft 215 is an actuator 216, provided with teeth 217 and a forwardly extending arm 218. The actuator 216 has secured thereto a stud 219, to which one end of the spring 220 is connected, the other end of said spring being connected to a rod (not shown) carried by the side frames 54 and 55. The spring 220 normally tends to rock the actuator 216 clockwise, but is prevented from doing so by a universal rod 221 (Figs. 1 and 5) carried by a pair of arms 222 secured on the shaft 215. One of these arms 222 is shown in Fig. 1 adjacent the left side frame 54, and the other arm 222 is located adjacent the right side frame 55. Secured to the lefthand arm 222 (Fig. 5) is a disk 223, having teeth meshing with a segment 224 pivoted on a stud 225 carried by the left side frame 54. The segment 224 has mounted thereon a pair of rollers 226, which cooperate with a pair of cam plates 227 secured to the main cam shaft 80.

When the cam shaft 80 is rotated during the operation of the machine, the segment 224 rocks the arms 222 first clockwise (Fig. 1) thus permitting the actuator 216 to be rocked under the influence of the spring 220 until stopped by the end of the depressed key unless it is prevented from doing so by the zero stop pawl 62. The rod 221 is adapted to move far enough to permit nine steps of movement of the actuator 216, but if the actuator is stopped by the depressed key or by the zero stop pawl 62 before it reaches the nine key, the rod 221 moves on idly.

After the actuator 216 has been positioned under control of one of the keys 50, and the rod 221 has finished its clockwise movement, a totalized pinion 230 is engaged with said actuator 216 in a manner to be hereinafter described. After the totalizer pinion has been engaged with the actuator 216, the segment 224 (Fig. 4) is rocked counter-clockwise by the cam plate 227, thereby causing the rod 221 to be moved back in a counter-clockwise direction, thus carrying the actuator 216 back to its home position. This backward movement of the actuator 216 adds an amount on the totalizer pinion commensurate with the value of the key depressed.

A stop is provided to prevent overthrow of the arms 222 and the universal rod 221 (Fig. 5). The arm 222 which is adjacent the left side frame 54 is provided with a surface 231 which contacts a stud 232 on the left side frame 54 when the arm 222 is in its normal position. A surface 233 engages the stud 232 when the arm 222 is rocked to its extreme home position, thereby limiting the movement in this direction. Thus it can be seen that the stud 232 limits the movement of the arms 222 and the universal rod 221 in both directions.

Transaction bank differential mechanism

An actuator 216 is also provided for the transaction bank, but this actuator is only used for the purpose of adjusting the type carriers (not shown) and indicators. It is sufficient to say here that there is no totalizer pinion 230 associated with the actuator 216 for the transaction bank.

"To" and "from" or station bank differential mechanism

The four lefthand bank of keys (Fig. 13), that is the "to" and "from" banks, are also provided with actuators 216 (not shown in this divisional application). However, as is the case with the differential bank, these station banks do not add into the totalizer but are used merely for setting type carriers and indicators, which are not shown in this divisional application. However, totalizer pinions have been provided adjacent these four banks for the purpose of printing the higher order amounts from the totalizer when printing the totals, as has been fully illustrated and described in the parent case. But since these banks do not add into the totalizer pinions, the actuators are not provided with the section of teeth 217 which on the amount actuators 216 enter the amounts in the totalizers.

Totalizers

The totalizer pinions 230 are all supported on a shaft 260 (Figs. 1 and 2) supported by two arms 261 secured to a shaft 262 carried by the side frames 54 and 55. Also secured to the shaft 262 is an arm 263 having pivoted thereto a link 264 carrying a stud 265 which is adapted to be held within a notch 266 (Fig. 4) on an arm 267 during adding operations. The arm 267 has a roller 268 which projects into a cam race in a cam disk 269 secured to the cam shaft 80. The cam race in this disk 269 is so timed that during the operation of the machine the totalizer pinions 230 are engaged with and disengaged from the actuators 216 at the proper time for adding. The totalizer pinions 230, held in lateral alinement on the shaft by spacing collars, are not shown in this application. The arm 267 is mounted on a shaft 210 supported by the side frames 54 and 55.

An alining device is provided for maintaining the totalizer pinions 230 in proper alinement when they are disengaged from the actuators 216. Secured to the shaft 262 (Fig. 1) adjacent each of the totalizer pinions 230 is an arm 275 having pivoted thereon an aliner 276 held by a spring 278 in contact with a stud 277 carried by the arm 275. The stud 277 is so located as to permit the nose of the aliner to be in engagement with its totalizer pinion 230 when the totalizer is disengaged from the actuator 216. As the totalizer moves into engagement with the actuator, the arms 275, being fast on the shaft 262, are rocked clockwise carrying the aliner 276 along until the tails 279 thereof strike a flange 280 formed on a plate secured to a cross bar 281, thus causing the aliners to be rocked far enough to disengage their noses from the totalizer pinions 230.

As the totalizer becomes disengaged from the actuators, the tails 279 are withdrawn from the flange 280, the springs 278 rocks the aliners 276 into engagement with the totalizer pinions 230, thus holding them in alinement. These parts are so arranged that the aliners are disengaged from the totalizer pinions at the time the totalizer pinions begin to engage the actuators 216 and again engage the totalizer pinions just before they become entirely disengaged from the actuators.

A spring-actuated aliner 282 is provided for alining the totalizer frame when the totalizer is in its engaged position. This aliner is held by a spring 284 against a stud 283 carried by one of the arms 275. As the totalizer becomes disengaged, the stud 283 becomes disengaged from a surface 285 on the aliner, thereby permitting the spring 284 to rock a cam portion 286 of the aliner into engagement with the stud 283, thus camming the totalizer frame into position to cause the pinions 230 to properly engage the teeth 217 of the actuator 216.

Transfer mechanism

It is not thought necessary to describe the transfer mechanism in this divisional application. If a description and illustration of the same is desired, reference may be had to the parent application, Serial Number 169,583.

Indicators

The machine is provided with a series of indicators 320 (Fig. 1 only one of which is shown in this application) for indicating the data printed on the ticket and detail strip, and also the mount entered in to the totalizer. The indicators disclosed herein are of a type which is first restored to zero position and then set up according to the amount of differential movement given to the totalizer actuators.

Each indicator is adjusted by a segment 321 (Fig. 1) loosely mounted on the shaft 215 and meshing with a gear 322. One of the gears 322 is secured to the end of a shaft 323 and one is secured to the end of each sleeve 324. The sleeves 324 are for the purpose of setting up the type carriers not illustrated in this application, but which are fully illustrated and described in the parent case. Each gear 322 meshes with a gear 325 loosely mounted on a rod 326 carried by the side frames 54 and 55. The gear 325 meshes with a pinion 327 secured to the indicator 320. When the rod 221 moves forwardly for setting the actuators 216 it engages a surface 329 on the segment 321 and moves the segment far enough in a clockwise direction to return the indicator 320 to its zero position. In this position the gear 325 is stopped by a rod 330 which passes through slots cut in the gears 325 and acts as a positive stop for the indicators when they reach their zero positions.

Coupling pinion mechanism

A coupling pinion 340 (Figs. 1 and 12) is provided for each differential mechanism for coupling the actuator 216 with the segment 321. The coupling pinion 340 is normally in mesh with the actuator 216 and with the segment 321, but at the beginning of the operation of the machine said pinion 340 is disengaged therefrom long enough to permit the actuator 216 to be adjusted under control of the depressed key and for permitting the rod 221 to restore the segment 321 to its normal position, as above described. After the actuator 216 has been adjusted the coupling pinion 340 is again engaged with the actuator 216 and segment 321, and the actuator is returned to its home position. This return movement of the actuator 216 is transmitted to the indicator 320 by the segment 321 and the train of gears above described.

Three separate means have been provided for disengaging the coupling pinions 340 from the actuators and the segments 321 and engaging said coupling pinions with such actuators and segments. All three of these operate at the same time during adding operations, but during repeat operations they function differently. The method of functioning during repeat operations will be hereinafter more fully described. One of these means has been provided for engaging and disengaging the coupling pinions for the three amount banks and the "to" bank. A separate means is provided for the two higher order or "from" banks, and another means for controlling the movement of the coupling pinions for the transaction bank. However, all of these means are operated from the same cam during adding operations, as will now be described.

Figure 8:
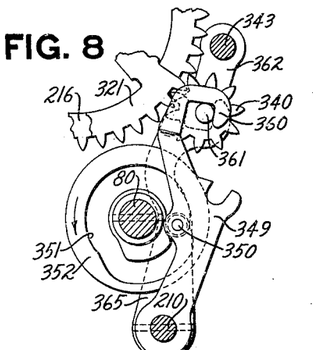
Fig. 8 is a detail view of the mechanism for engaging the totalizer with the actuator and disengaging it from this actuator during reset operations. This figure also shows the mechanism for disengaging the coupling pinions from the actuator and its associated differentially adjustable members and again engaging the coupling pinions with these two members during adding operations.

The coupling pinions 340 for the amount and "to" banks are all loosely mounted on a rod 341 (Figs. 1, 6 and 12) carried by two arms 342 secured to a shaft 343. Also secured to the shaft 343 is an arm 344, having a stud 345 which enters a notch in a link 346 guided at its upper end by a stud 347 which projects into a slot 353 in the repeat release key 164. The lower end of the link 346 is pivoted to an arm 348 secured to the shaft 210. Also secured to the shaft 210 is an arm 349 (Figs. 8 and 12) provided with a roller 350 which projects into a cam groove 351 in a cam disk 352 secured to the main cam shaft 80.

At the beginning of an operation of the machine, the cam 351, through the arm 349, rocks the shaft 210 and arm 348 (Fig. 6) thereby lowering the link 346. The link 346 upon being lowered rocks the arm 344 and shaft 343 counter-clockwise, thus rocking the arm 342 counter-clockwise far enough to disengage the pinions 340 from the actuators 216 and segments 321 for the amount and the "to" banks.

The coupling pinion 340 for the transaction bank is disengaged directly by means of the arm 349. This arm carries a hook-shaped end 360 (Figs. 8 and 12), which engages a stud 361, upon which the coupling pinion 340 of the transaction bank is mounted. This stud 361 is secured to an arm 362 loosely mounted on the shaft 343. As the cam disk 352 rotates, the arm 349 is rocked as above mentioned, thereby rocking the coupling pinion 340 from engagement with the segments 321 and actuators 216 of the transaction bank.

A clearance is provided between the arm 349 and stud 361, so that the arm will receive an idle movement before it engages the stud 361. This is necessary because the arm 349, which is also used for engaging the totalizer, has more movement than is necessary for disengaging the pinion 340.

The coupling pinions 340 for the "from" bank are controlled by means of an arm 365 (Figs. 8 and 12) secured to the shaft 210. The arm 365 is bifurcated to engage a rod 366 upon which the coupling pinion 340 for the "from" banks are mounted. The rod 366 is carried by a pair of arms 367 sleeved together and loosely mounted on the shaft 343. Thus when the shaft 210 is rocked to disengage the coupling pinions 340 for the amount banks, as above described, the arm 365 disengages the coupling pinions 340 for the "from" bank.

A clearance is provided between the arm 365 and the rod 366 so that the arm 365 will receive an idle movement before it engages the rack 366. This is necessary because the arm 365 is operated by the same cam which operates the arm 349 for engaging the totalizer, and which receives a greater movement than is necessary for disengaging the pinion 340.

Figure 12:
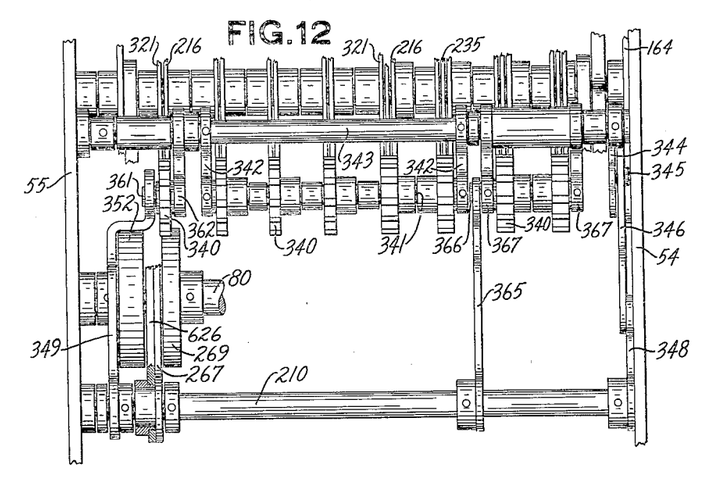
Fig. 12 is a rear elevation of the totalizer engaging and disengaging mechanism, and also a portion of the repeat mechanism.

As can be seen in Fig. 12, the coupling pinions 340 for the "to" and "from" banks are wider than those in the amount and transaction banks. This is necessary since in the "to" and "from" banks a segment 235 (not necessary to be described in this application) is located between the actuator 216 and segment 321, thus placing them further apart than in the amount and transaction banks.

Coupling pinion alining device

In order to keep the coupling pinions 340 in proper alinement when they are disengaged from the actuators 216 and segments 321, so that upon subsequent engagement they will properly mesh with their associated actuators 216 and segments 321, an aliner 368 (Fig. 1) has been provided. When the pinions become disengaged from the actuators and segments they engage the aliner 368 which holds the pinions against any rotation. The aliner is secured to the back frame 241 of the machine.

Actuator alining device

An alining device has also been provided for properly alining the actuator 216 and the segment 321. An alining pawl 381 for each actuator 216 and each segment 321 (Fig. 1), which is wide enough to engage both the actuator and the segment, is secured to a shaft 382 carried by a bracket on the back frame 241. One of the alining pawls 381 has mounted thereon a roller 383 held in engagement with the cam 384 on the main cam shaft 80 by a spring 385 attached to an arm 386 secured to the shaft 382.

The cam 384 is so timed that the alining pawls 381 are disengaged from the actuators 216 and segments 321 just before the rod 221 moves forwardly to permit the actuators 216 to operate. Just before the totalizer engages the actuator 216, the alining pawls 381 are reengaged with the actuators and segments to properly aline them, but are again disengaged therefrom before the actuators and segments are returned to their normal positions by the rod 221. After the actuators and segments have been properly restored, the aliners 381 are again engaged therewith to prevent movement thereof.

Repeat release key mechanism

The repeat mechanism provided in this machine is characterized by the fact that the operator need not know at the time of making the original entry that the amount is to be repeated. A previous amount can be repeated at any time after the operation is completed, so long as no other keys have been depressed in any of the amount banks. In repeat mechanisms heretofore known in the art, it is usually necessary to make a preliminary setting before the original amount is entered in order that the amount may be later repeated. This preliminary setting is entirely unnecessary in the present invention. This type of repeat mechanism is particularly useful in the system to which it is adapted herein because the operator on the bus sets up and prints the tickets as the passengers are boarding the bus. Any number of passengers may require tickets for the same destination, and therefore the passengers can be more speedily served by a special repeat mechanism which has been provided herein. All that the operator needs to do is to glance at the indicators, and if they show the same amount as that which is to be printed on the next ticket, all that he needs to do is to press the repeat release key and the machine will be released and issue a ticket of the same denomination as previously issued. However, it is apparent that the repeat mechanism is useful in a great many other lines of business, and it is neither desired nor intended to limit the repeat mechanism to this particular system shown and described herein, as that system is used for illustrative purposes only.

It will be remembered that the segment 321 (Fig. 1) is left standing at the end of the operation of the machine in the position to which it was adjusted under control of the depressed amount keys, and that the actuator 216 is always restored to its home position. During repeat operations the segment 321 and gears 322 and 325, together with the rod 330, are used for controlling the positioning of the actuator 216. During repeat operations none of the keys 50 or 67 are depressed, and therefore the actuators 216 move up until stopped by some other means than the keys. This means consists of the rod 330, which stops the gear 325 and by means of the gear 322 stops the segment 321 in its zero position, as above described.

Depression of the repeat release key or manipulative member 164 (Fig. 6) disconnects the link 246 from the stud 345, and therefore when the machine starts to operate the coupling pinions 340 will not be disengaged from the actuators 216 and the segments 321. A notch 401 cut in the lower end of the key 164 engages the stud 345, thereby holding the arm 344 and pinions 340 in positive alinement when the repeat release key or manipulative member is depressed. Thus when the rod 221 (Fig. 1) receives its forward movement to restore the segments 321 to their zero positions, the actuators 216 will be moved a like distance, thereby setting up in the particular actuators the amount previously standing on the segments 321. During the return movement of the rod 221 the coupling pinions remain engaged with the actuators and segments, and therefore the actuators 216 are returned to their home positions and the segments 321 are returned to the positions in which they were standing at the beginning of the repeat operation.

During the repeat operation the totalizer is engaged and disengaged from the actuator 216 at the same time as during an ordinary adding operation, and therefore the amount previously standing on the segment 321 will again be added into the totalizer pinions. Simultaneously the indicators and type carriers, the latter not shown in this application, will be adjusted in the same manner as before described for an ordinary adding operation. The means for disconnecting the link 346 from the stud 345 includes the slot 352, through which the stud 347 projects. Depression of the manipulative member 164, by means of the stud 347, rocks the link 346 clockwise until it becomes disengaged from the stud 345.

By referring to Fig. 12, it will be seen that the disconnection of the link 346 from the stud 345 only prevents disengagement of the coupling pinions 340 for the three amount banks and for the two "to" banks. The transaction bank and the "from" bank are controlled by depressed keys during repeat operations in the same manner as during regular adding operations. It is necessary to have a key in the transaction bank in depressed position before the machine can be released for operation, and for this reason a key is always in position to control the differential of the transaction bank during repeat operations. The keys in the "from" bank and in the transaction bank are, as previously stated, stay-down keys, that is, at the end of the operation these keys are not released, as is the case with the amount keys. For this reason a key is positioned in each of the "from" banks during repeat operations and therefore controls the differential movement of the actuators in the "from" banks during repeat operations. Thus it can be seen that the differentials in the "from" and "transaction" banks are controlled by keys during repeat operations instead of by means of the gears 322, 325 and rod 330, as is the case in the amount banks.

It is not necessary to depress the motor bar 76 to release the machine for a repeat operation. The repeat release key or manipulative member 164 is adapted to release the machine, and for this reason all that is necessary for a repeat operation is to depress this manipulative member 164.

Depression of the key or manipulative member 164 moves a stud 410 (Fig. 6) into a slot 411 of an arm 412 secured to a shaft 413. The slot 411 is so formed that when the stud 410 enters therein, the arm 412 and shaft 413 are rocked counter-clockwise. This counter-clockwise movement of the shaft 413 rocks an arm 414 (Fig. 2) secured to the shaft, counter-clockwise far enough to cause a stud 415 on said arm 414 to strike the lower end of the release pawl 114, and rock said pawl clockwise, thus disengaging it from the flange 113 on the link 110 so as to release the machine in identically the same manner as the depression of the motor bar 76 releases the machine, as has been previously described.

The arm 412, shaft 413, and arm 414 are held in normal positions by a coil spring 416 (Figs. 6 and 11) which is coiled around the hub of the arm 412 and having each end bear against a stud 417 carried by the arm 412. The extreme ends of the spring 416 also normally bear against a stud 418 mounted in the left side frame 54. When the stud 410 on the repeat release key 164 cams the arm 412 counter-clockwise, the spring 416 is tensioned and the righthand end of said spring is held against the stud 418. Upon release of the repeat release key or manipulative member 164, the lefthand end of the spring 416, bearing against the stud 417, causes the arm 412 to be returned to its normal position and the spring again engages the lefthand side of the stud 418.

The arm 412 is also adapted to be rocked clockwise by the total lever 162 in a manner to be hereinafter described. When the arm 412 is rocked clockwise, the spring 416 is tensioned and its lefthand end is held against the stud 418. When the total lever 162 is returned to its adding position, the righthand end of the spring 416, bearing against the stud 417, restores the arm 412 to its normal or home position.

A spring 419 is provided for maintaining the repeat release key 164 in its normal or home position. This spring 419 restores the repeat release key 164 to its normal position during a repeat operation and also assists in restoring other parts, to be later described, to their home positions. A stud 420 secured to the left side frame 54 provides a stop for the repeat release key 164, thus limiting the movement thereof under the influence of the spring 419. A stud 421 also secured to the left side frame 54 provides a stop for limiting the downward movement of the repeat release key 164 when it is depressed to release the machine.

When the arm 412 is rocked clockwise under the influence of the total lever 162, the upper surface 422 of said arm 412 is rocked beneath the stud 410, thus locking out the repeat release key 164 after the total lever has been moved out of its add position.

As previously described, during a repeat operation, the differentially movable actuator 216 for each amount bank and for the "to" banks is moved under control of its associated segment 321. For this reason it is necessary to rock the zero stop pawls 62 for these banks out of their effective positions during repeat operations. As above mentioned, when an amount key is depressed, its associated zero stop pawl 62 is moved into an ineffective position. However, during repeat operations, none of the amount keys are depressed, and therefore another means is provided for rocking the zero stop pawls to their ineffective positions. The repeat release key 164 is provided with a stud 430 (Fig. 6) which upon depression of said key enters a slot 431 in an arm 432, secured to the shaft 433. Also secured to the shaft 433 for each of the amount and "to" banks is an arm 434 (Figs. 1 and 9) provided with a stud 435 adapted to engage the zero stop pawl 62 and rock it to its ineffective position upon depression of the repeat release key 164.

Each arm 434 is also provided with a flange 436 which is rocked into the path of a pawl 437 pivoted on the flexible detent 57. Thus when the arms 434 are rocked by depression of the repeat release key 164 the flexible detents 57 in the amount and "to" banks are also locked against movement, and therefore no key can be depressed in either of these banks after the repeat release key 164 has been depressed.

*Repeat release key lockout mechanism.*

The pawls 437 above described, also provide a means for locking the repeat release key 164 against depression after one of the amount or "to" keys has been depressed. When the flexible detent has been operated by depression of the key, the associated pawl 437 will have moved into the path of the flange 436, thereby preventing movement of the arm 434, and by means of the shaft 433 and arm 432 (Fig. 6) prevents depression of the repeat release key or manipulative member 164.

The arms 434 (Fig. 9) associated with the "to" and the amount banks of keys 67 and 50 respectively, are restored to their normal positions near the end of a repeating operation by the combined influences of the springs 66 associated with the "to" and amount keys, the spring 179 (Fig. 6) and the spring 419.

The lower end 438 of the pawl 437 normally extends below the shoulder 439 of the detent 57 to provide a better factor of safety for the interlock between the amount or "to" keys and the repeat release key 164. In other words, a very slight depression of an amount or "to" key moves its associated pawl 437 into the path of the flange 436 on the arm 434, thus preventing any movement of the repeat release key. Due to the peculiar angle of movement of the flange 436 relatively to the shoulder 439, as the flange is moving toward the left (Fig. 9) when the repeat release key 164 is depressed, the flange 436 strikes the pawl 437 and rocks said pawl counter-clockwise until the flange rests against the shoulder 439. Since the pawls 437 are flexibly mounted, the springs 66, 179 and 419 have only to overcome a minimum amount of frictional interference as the arms 434 are restored to their normal positions by said springs.

Means is also provided to prevent depression of the repeat release key after the machine has been released for an adding operation.

It will be remembered that when the machine is released for adding operation, the yoke 157 (Fig. 6) is rocked clockwise and that the previously mentioned arm 163 is fast to said yoke 157. When this occurs, the upper edge 442 of the arm 163 is rocked beneath the stud 430 on the repeat release key 164 thus preventing its depression.

When the machine is released for a repeat operation by depression of the repeat release key 164 as has been previously described, a recess 443 in the arm 163 engages the stud 430 on the key 164, when said key has been fully depressed, and holds the key in this depressed position until the yoke or bail 157 and arm 163 are restored to their normal positions near the end of the operation of the machine in the manner previously explained.

*Key release throw out mechanism*

It will be remembered that the cam 181 (Fig. 6) by operating the pitman 178, through the arms 175 and 173 rocks the shaft 160 to lower the flexible detent 57 to release the keys at the end of the operation of the machine. During repeat operations as just described, the arm 434 (Fig. 9) is rocked far enough to cause the flange 436 thereon to be moved beneath the pawl 437, thereby locking the detent 57 against operation as above described. For this reason it is necessary during repeat operations to disconnect the driving connection between the cam 181 and the shaft 160. The arm 432 is provided with a forwardly extending arm 440 (Fig. 6) which is connected to the pitman 178 by a link 441. Thus, when the repeat release key 164 is depressed and the arm 432 is rocked, as above mentioned, the arm 440 lowers the link 441 thereby lowering the forward end of the pitman 178 and in this manner disconnecting the pitman from the stud 177 on the arm 175. Therefore, during repeat operations when the cam 181 is rotated the pitman 187 moves idly and the key release mechanism is rendered ineffective.

Total taking operation

The machine has been described for performing adding and repeat operations. This machine is also capable of performing total taking operations. The total control lever 162 (Figs. 2, 9 and 13) has three positions, an "add", a "read" and a "reset" position. When it is desired to read the totals on the totalizer the lever is moved to the read position and the machine operates in the usual manner. However, if it is desirable to read the totalizer and reset it to zero, the total lever is moved to the reset position and an operation of the machine will cause a total to be printed and the totalizer to be reset to zero.

Reading operation

During reading operations the totalizer pinions 230 (Fig. 1) are rocked into engagement with the actuators 216 at the beginning of the operation of the machine. Then when the rod 221 is moved forwardly each totalizer pinion is rotated backwardly until the long tooth 302 is stopped by the forward end of the transfer trip pawl 300. In these positions the totalizer pinions are set at zero and the amount which was standing on them will have been transferred to the actuators 216. Then upon return movement of the rod 221 the amount will be again added on the totalizer and the indicators will be adjusted accordingly in the same manner as they are adjusted in adding operations.

The cam for controlling the engagement and disengagement of the totalizer during reading operations is shown in Fig. 3. In order to effect the proper change of timing, it is necessary to disengage the stud 265 (Fig. 2) from the notch 266 in the arm 267 and place it into a notch 625 (Fig. 3) of an arm 626. The stud 265 is adjusted by the total lever 162. The total lever is provided with a stud 627 (Fig. 2), which projects into a cam slot 628 of an arm 629 pivoted on a stud 624 in the right side frame 55 of the machine. As the total lever 162 is raised to the read position, the stud 627, cooperating with the cam slot 628, rocks the arm 629 clockwise. This arm 629 is bifurcated and engages a stud 630 of the link 264. Therefore, as the arm 629 is rocked clockwise the stud 621 is disengaged from the notch 266 (Fig. 4) of the arm 267 and is placed into the notch 625 (Fig. 3) of the arm 626.

The arm 626 has a roller 632 which engages the cam race in the cam 352 mounted on the cam shaft 80. This cam race in the cam 352 is so timed as to engage the totalizer pinions 230 with the actuators 216 before the actuators move and to disengage the pinions from the actuators after the rod 221 has been moved back to its normal position, so that the amount which was taken from the totalizer pinions will be again added on the totalizer and the indicator set up to indicate that amount.

During the time the total lever 162 is being moved out of the add position, the totalizer has a tendency to rock into engagement with the actuator due to the springs 289 (Fig. 1) on the transfer arms 291 which bear against the bell cranks 295 mounted on the arms 275 secured to the shaft 262. To prevent this engagement of the totalizer pinions with the actuators, a cam 640 (Fig. 1) secured to the shaft 80 is in the path of a square stud 641 on an extension 642 of the arm 275 when the machine is in its home position. Only one arm 275 is provided with the extension 642 since all other arms 275 are secured to the shaft 262 the one arm 642 is positioned to maintain all of the arms 275 in their normal positions. The totalizer engaging arms 261 (Fig. 2) are also secured to the shaft 262, and therefore, the totalizer is also maintained in its normal position when the total lever 162 is shifted to withdraw the stud 265 from the notch 266, and until the stud is engaged in the notch 265.

If desirable the machine can be built so that the total lever will have a "non-add" position. In such a machine it is necessary to provide a longer leverway for the total lever 162, so that the lever can be moved downwardly below the "add" position. In order to permit this adjustment, the slot 628 (Fig. 2) is provided with a rearwardly extending portion which when the lever is moved downwardly adjusts the stud 265 to a neutral position in which it will not enter the notch in either of the arms 267 or 626.

As previously stated the "to" and "from" banks on the left hand end of the machine are used for setting up indicators during total-taking operations. For this purpose the segment 235 (Fig. 12) has been provided in each of these banks. This segment is inactive during adding operations. During total-taking operations it is necessary to render this segment active. This is accomplished by a coupling arm (not shown in this divisional case but fully illustrated and described in the parent case) so that the segment 235 and actuator 216 move as a unit during total-taking operations and perform the same function as the actuator 216 in the amount bank. The previously mentioned four higher order totalizer pinions 230 are in alinement with segment 235 and therefore the four higher order pinions control the differential movement of these segments 235 and in this manner the amount standing on said higher order totalizer pinions is transferred to the indicator.

Before the totalizer pinions can control the differential movement of the actuators 216 it is necessary to move the zero stop pawls 62 (Fig. 1) to their ineffective positions which is accomplished by means of a stud 645 on the total lever 162 (Figs. 2, 9 and 11) which contacts a cam surface on the lower end of an arm 646 secured to the shaft 433 and rocks said arm 646 counter-clockwise when the total lever is moved out of the add position. The counter-clockwise movement of the arm 646 rocks the shaft 433 and the arms 434 counter-clockwise, thus rocking the studs 435 thereon into engagement with the zero stop pawls 62 and in this manner move them to their ineffective positions.

As will be recalled the arms 434 are provided in the amount and "to" banks only and therefore this means for rocking the zero stop pawls to ineffective positions is effective in these banks only. Other means must be provided for rocking the zero stop pawls 62 in the "from" banks to their ineffective positions but it is not thought necessary to illustrate or describe such mechanism in this divisional application and reference may be had to the parent case for such description if desirable.

Reset operation

The reset operation is performed in the same manner as a read operation, the only difference being that the totalizer is not held in engagement with the actuators 216 while the actuators are being restored. Therefore, the amount is not reentered in the totalizer. To control this timing of the engagement of the totalizer the stud 265 (Fig. 2) is moved into a notch 659 of the arm 349 which engagement is accomplished by the arm 629 and slot 628 in the same manner as for read operations. However, inasmuch as the reset position of the total lever 162 is higher than the read position, said total lever is moved farther and therefore the lever 629 is moved a greater distance.

The arm 349 is rocked by the cam race in the cam 352 as previously described and the timing thereof is such that at the beginning of the operation of the machine the totalizer is engaged with the actuators 216 and later disengaged before the rod 221 is restored to its home position. Therefore, it can be seen that with the totalizer disengaged, when the actuators 216 are restored the amount will not be reentered in the totalizer and it will therefore be left at zero.

Total lever interlock

When the total lever 162 is moved out of its add position all of the keys except those in the transaction bank are locked against operation. Movement of the lever 162 (Fig. 2), through the stud 645 rocks the arm 646 counterclockwise thereby moving the flanges 436 (Figs. 1 and 9) beneath the pawls 437 on the flexible detents for the amount banks and the "to" bank. The cam surface 639 (Fig. 11) rocks the shaft 413 through the medium of the stud 638 secured to the arm 414. In this manner all of the keys except those of the transaction bank are locked against depression during a total-taking operation.

Movement of the total lever 162 out of adding position also locks out the repeat release key 164. Rocking of the shaft 413 at this time also rocks the arm 412 (Fig. 11) in a clockwise direction, thereby positioning the locking surface 422 beneath the stud 410 on the repeat release key 164, thus preventing any depression of that key.

The total lever 162 must be adjusted in one of the three positions before the machine can be released. The arm 161 (Fig. 2) has a stud 670 which is rocked into a notch 672 in a block 671 when the total lever is in the "add" position and the machine is released. This block 671 is carried by the total lever 162. However, if the machine is released with the total lever in the read position, the stud 670 rocks into a notch 673 in the block 671. When the machine is released with the total lever in the "reset" position, the stud 670 rocks beneath the block 671. If the total lever is in one of the intermediate positions, that is, between the "add" and the "read" or "read" and "reset" positions then when the motor bar 76 is depressed the stud 670 engages the surface of the block 671, and prevents the yoke 157 from being rocked and in this manner prevents movement of the link 110 which in turn prevents release of the machine in the manner previously described.

If after a "reset" operation it is desirable to reenter the total on the totalizer, this may be done by the repeat mechanism in identically the same manner as for repeating and adding operations. At the end of the total-taking operation, the amount taken from the totalizer is standing on the indicator and therefore in order to reenter this amount, all that is necessary is to press the repeat release key 164 and operate the machine. During such operation the segments 321 (Fig. 1) control the differential positions of the actuators 216 in the same manner as during adding repeat operations.

Operation

A brief description of the operation and use of the machine will now be given.

The machine may be located somewhere near the entrance of the bus and as a passenger enters the bus the operator depresses the proper amount keys, the keys for the particular station at which the passenger boards the bus, and the keys representing the station to which the passenger is going. The operator then depresses a key in the transaction bank which designates the kind of fare paid that is, whether it is a half fare, a round trip or whatever the fare might be after which the operator depresses the motor bar 76 which releases the machine for operation. If the machine is motor driven, the motor is released automatically by depression of the motor bar 76. However, if it is a manually operated machine the operator must turn a crank (not shown) twice after the motor bar 76 has been depressed.

If the next passenger is destined for the same station and buys the same kind of a ticket, all that is necessary for the operator to do is depress the repeat release key 164 whereupon the machine will be released for operation and will issue a duplicate of the ticket and enter the same amount on the totalizer and in the indicators as in the previous operation. In order to perform this repeat operation all that is necessary is to glance at the indicator to determine that the proper amount was previously entered and then depress the repeat release key. It is not necessary for the operator to know at the time the original entry is made that the next operation is to be a repeat operation.

An interlock is provided so that if any one of the amount or "to" keys is depressed after the original entry the repeat release key 164 is positively locked against operation. However, as above stated the "from" station key can be changed without effecting the locking out of the repeat release key. The operator may also depress any one of the transaction keys inasmuch as one of these keys in this bank must always be depressed before the machine can be released for operation.

The totals standing on the totalizer can be read without disturbing the setting on the totalizer or the total can be printed and the totalizer reset to zero. This is controlled by the total lever 162 which has three positions of adjustment one "add", one "read" and one "reset". The movement of the total lever 162 out of its adding position into one of its total-taking positions controls the engagement and disengagement of the totalizer with the actuators so that the totalizer will be properly engaged. During this total-taking operation none of the keys excepting the keys in the transaction bank can be depressed and therefore the zero stop pawls for the amount banks and the "to" banks are not rocked to their ineffective positions by the keys as during the entry of items. For this reason mechanisms are provided to rock the zero stop pawls in the amount banks and the "to" banks out of their effective positions as previously described in order to permit the actuators to be controlled by the totalizer pinions. This interlocking feature and the rendering of the zero stop pawls ineffective is operated and controlled by the total lever when moved out of the adding position to any one of the total-taking positions.

While the forms of mechanism herein shown and described are admirably adapted to fulfill the objects primarily stated it is to be understood that it is not intended to confine the invention to the forms or embodiments herein disclosed for it is susceptible of embodiment in various forms all coming within the scope of the claims which follow.

What is claimed is:

1. In a machine of the class described, the combination of amount and data determining devices; means controlled thereby to enter amounts and data; a repeat mechanism including a manipulative member, operable subsequently to a machine operation during which the entry of the original amounts and data is completed, for causing the original amounts and data to be again entered; and means for rendering the repeat mechanism ineffective when entering original amounts and data.

2. In a machine of the class described, the combination of amount and data determining devices; means controlled thereby to enter amounts and data; a repeat mechanism including a manipulative member, operable subsequently to the machine cycle in which the entry of the original amounts and data is completed, for causing a repeat operation; means for rendering the repeat mechanism ineffective when entering original amounts and data; a shaft adapted to be rocked upon operation of said manipulative member, said shaft having rigid thereto a plurality of arms; and additional means including detents operated by said devices and carrying pivoted members movable into the paths of said arms to prevent operation of the manipulative member when any amount or data device is operated.

3. In a machine of the class described, the combination of amount and data determining devices; means controlled thereby to enter amounts and data; a repeat mechanism including a manipulative member, operable subsequently to a machine cycle in which the entry of original amounts and data is completed, for maintaining the repeat mechanism in position for causing the original amounts and data to be again entered; and means operable during every operation of the machine adapted to render the repeat mechanism ineffective when entering original amounts and data.

4. In a machine of the class described, the combination of a differentially adjustable actuator; manipulative means for controlling said actuator; a detent operated by any one of said manipulative means; a member; a coupling device normally engaging both the actuator and member; means for disengaging the coupling device from the actuator and the member for permitting differential adjustment of the actuator, said means adapted to reengage the coupling device after the differential adjustment of the actuator; a driving means for returning the actuator to its normal position, thereby transferring the setting of the actuator to the member; a manipulative device for preventing the coupling device from being disengaged from the actuator and member, thereby causing the setting of the member to be transferred back to the actuator for repeat operations; a projection on said manipulative device; and means cooperating with the detent and operated by said projection for preventing operation of the manipulative means after the manipulative device has been operated.

5. In a machine of the class described, the combination of a differentially adjustable actuator; manipulative means for controlling said actuator; a detent operated by any one of said manipulative means; a member; a coupling device normally engaging both the actuator and the member; means for disengaging the coupling device from the actuator and the member for permitting differential adjustment of the actuator, said means adapted to reengage the coupling device after the differential adjustment of the actuator; a driving means for returning the actuator to its normal position, thereby transferring the setting of the actuator to the member; a manipulative device for preventing the coupling device from being disengaged from the actuator and member, thereby causing the setting of the member to be transferred back to the actuator for repeat operations; a projection on said manipulative device; means cooperating with the detent and operated by said projection for preventing operation of the manipulative means after the manipulative device has been operated; and a pivoted member on said detent, said pivoted member cooperating with the means which cooperates with the detent for preventing operation of the manipulative device after any one of the manipulative means has been operated.

6. In a machine of the class described, the combination of a registering mechanism, manipulative devices to control the registrations by said registering mechanism; a normally operative substitute mechanism for said devices to control registrations; means automatically rendering the substitute mechanism ineffective; and means operable at any time subsequently to a registering operation and before the operation of the manipulative devices to disable the means for automatically rendering the substitute mechanism ineffective and to prevent operation of the manipulative devices.

7. In a machine of the class described, the combination of manipulative amount determining devices; accumulating mechanism; an actuator therefor; a repeat mechanism co-acting with said actuator to control the same to repeat a previous movement which was set up under control of the manipulative amount determining devices when later desired, said repeat mechanism including a manipulative member operable subsequently to that operation during which the amount to be repeated is first accumulated; and means under control of said manipulative amount determining devices for preventing an operation of said manipulative member when any one of said manipulative amount determining devices has been operated.

8. In a machine of the class described, the combination of data retaining means, a keyboard for setting up an item, means for entering the item into the retaining means, means for then erasing the set up from the keyboard to permit setting up another item thereon; optionally operable means associated with the item entering means to control the same after the set up has been erased to reenter said erased set up into the retaining means; and means under control of said item entering means for preventing operation of said optionally operable means after an operation of the keyboard has been initiated.

9. In a machine of the class described, the combination of data retaining means; manipulative devices for setting up an item; means for entering the item into the retaining means; means for erasing the set up after the item has been entered; mechanism adapted to be controlled by the item entering means; means operable subsequently to the erasing of the set up of said item for controlling the mechanism to again enter said item; and mechanism for preventing an operation of the last mentioned means when any of said manipulative devices is operated to set up an item subsequently to the erasure of that item by said second mentioned means.

10. In a machine of the class described, the combination with means for setting up an item and entering the same and then erasing the set up to permit setting up another item; an adjustable device controlled by said means; a manipulative means for releasing the machine and for controlling said device to cause a repeat entry of the item previously entered; and means under control of the first mentioned means for preventing an operation of said manipulative means when the first mentioned means is operated to set up an item subsequently to the erasure of the previous set up.

11. In a machine of the class described, the combination of keys for setting up an item; an actuator adapted to be differentially adjusted under control of said keys; an adjustable member; means to move the actuator and destroy the differential adjustment thereof and to adjust said adjustable member to preserve the differential adjustment taken from the actuator; means to re-adjust the actuator under control of said member to restore the original differential adjustment to the actuator; and means to prevent simultaneous operation of said keys and the last mentioned means.

12. In a machine of the class described, the combination of keys for setting up an item; an actuator adapted to be differentially adjusted under control of said keys; an adjustable member; means to move the actuator and destroy the differential adjustment thereof and to adjust said member to preserve the differential adjustment taken from the actuator; means to re-adjust the actuator under control of said member to restore the original differential adjustment to the actuator; and means to prevent manipulation of any of said item setting up keys during an operation in which the last mentioned means which re-adjusts the actuator is controlling the machine.

13. In a machine of the class described, the combination of a totalizer; item keys; means controlled thereby for entering an item in the totalizer; means for releasing said keys after the item has been entered; a manipulative means to release the machine to cause the item set up to be entered in the totalizer; adjustable means adjacent to and associated with the item-entering means; a second manipulative means to release the machine for the next operation; means controlled by the second manipulative means and operated by the adjustable means to cause the means theretofore controlled by the keys to repeat the entry of the item previously entered; and means to prevent any manipulation of said item keys when said second manipulative means is controlling the machine.

14. In a machine of the class described, the combination of registering mechanism; manipulative devices to control the data registered by said mechanism; means adapted to cooperate with said registering mechanism to determine the adjustment of the registering mechanism; a manipulative means operable after a registering operation and prior to another operation of the manipulative devices to cause said first mentioned means to determine the adjustment of the registering mechanism to repeat the data last registered; and mechanism for preventing a simultaneous operation of said manipulative devices and said manipulative means.

15. In a machine of the class described, the combination of a totalizer; normally operable amount-determining devices to set up the items intended for entry in the totalizer; a differentially adjustable actuator, the excursions of which are under control of the amount-determining devices to enter items in the totalizer; settable means normally adjustable under control of the differentially adjustable actuator as it enters the items in the totalizer to represent corresponding items; means to cause the settable means to control the actuator on an operation immediately subsequent to one wherein the manually operated amount-determining devices have been operated to effect a repeat entry on the totalizer of the item last set up, exclusive of the manually operated amount determining devices; and means for rendering said amount-determining devices inoperable during said repeat entry operations.

16. In a machine of the class described, the combination of amount keys; an accumulating mechanism; an actuator therefor adapted to be controlled by said keys to enter a member into the accumulating mechanism; a repeat mechanism co-acting with said actuator to control the actuator to receive a previous movement of the actuator to again enter the original number into the accumulating mechanism, said repeat mechanism constructed to effect such a control over the actuator only after the original entry of the number into the accumulating mechanism is completed; and means to render said keys inoperable during an operation of the machine when the repeat mechanism is controlling.

17. In a machine of the class described, the combination of amount keys; an accumulating mechanism; an actuator to enter a number into the accumulating mechanism; a repeat mechanism co-acting with said actuator to control the actuator to repeat a previous movement of the actuator when later desired, said repeat mechanism including a manipulative member to effect a control over the accumulating mechanism only after the original entry of the number into the accumulator has been made; and means for preventing an operation of any of the amount keys and said manipulative member during the same operation of the machine.

18. In a machine of the class described, the combination of a totalizer; item-entering mechanism; a total lever having a normal adding position and totaling positions; turn-to-zero mechanism; means under control of the turn-to-zero mechanism to set the total upon the item-entering mechanism; a manually operable member to control the item entering mechanism to repeat the total during a subsequent machine operation; a projection on said member; and means operable by the total lever for cooperating with said projection to prevent an operation of the manipulative member after movement of the total lever out of its normal position.

19. In a machine of the class described, the combination of a totalizer; a total-controlling member; turn-to-zero mechanism; means, operable after the completion of the operation of the turn-to-zero mechanism, for causing the total to be repeated during the operation subsequent to the original turn-to-zero operation; means under control of the total controlling member for preventing operation of the first mentioned means while the total controlling member is in controlling position.

20. In a machine of the class described, the combination of a totalizer; zeroizing mechanism therefor; a total controlling member; total storage means; means to operate said mechanism to erase the total from the totalizer and set up said total in the total storage means and erase the total from said mechanism; a device adapted to coact with said operating means to restore the total to the zeroizing mechanism, the total storage means, and the totalizer subsequently to said erasures when later desired, said device including a manipulative member to establish the coaction between said device and the operating means; and means intermediate said manipulative member and said total controlling member to prevent an operation of said manipulative member during an operation when the total-controlling member is controlling the machine.

WILLIAM H. ROBERTSON.